(12) United States Patent
Kuriyama

(10) Patent No.: US 7,154,741 B2
(45) Date of Patent: Dec. 26, 2006

(54) NIOBIUM CAPACITOR AND METHOD FOR MANUFACTURING SAME

(75) Inventor: Chojiro Kuriyama, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 10/523,102

(22) PCT Filed: Jul. 31, 2003

(86) PCT No.: PCT/JP03/09771

§ 371 (c)(1),
(2), (4) Date: Feb. 1, 2005

(87) PCT Pub. No.: WO2004/013879

PCT Pub. Date: Feb. 12, 2004

(65) Prior Publication Data

US 2006/0039101 A1    Feb. 23, 2006

(30) Foreign Application Priority Data

Aug. 2, 2002  (JP)  ............................. 2002-225756

(51) Int. Cl.
*H01G 9/04*   (2006.01)
*H01G 9/00*   (2006.01)

(52) U.S. Cl. ...................... 361/528; 361/523; 29/25.03

(58) Field of Classification Search ........ 361/523–525, 361/508, 504, 522, 541, 528; 29/25.03
See application file for complete search history.

(56) References Cited

U.S. PATENT DOCUMENTS

| | | | |
|---|---|---|---|
| 6,185,090 B1 * | 2/2001 | Pozdeev-Freeman | ........ 361/524 |
| 6,207,327 B1 * | 3/2001 | Takada et al. | .............. 429/304 |
| 6,661,646 B1 | 12/2003 | Naito et al. | |
| 2005/0041372 A1 * | 2/2005 | Omori et al. | ................ 361/508 |

FOREIGN PATENT DOCUMENTS

| | | | |
|---|---|---|---|
| JP | 2000-188241 | * | 7/2000 |
| JP | 2000-188243 | | 7/2000 |
| JP | 2000-340460 | * | 12/2000 |
| JP | 2001-102272 | | 4/2001 |

* cited by examiner

*Primary Examiner*—Eric W. Thomas
(74) *Attorney, Agent, or Firm*—Hamre, Schumann, Mueller & Larson, PC

(57) ABSTRACT

A niobium capacitor having an anode (1) with niobium as its maim component, and a dielectric layer (4) formed on the anode. The anode (1) and the dielectric layer (4) are in close contact with each other with an interface therebetween. A junction region is defined as the region including the interface. The junction region contains a specific amount of manganese.

16 Claims, 5 Drawing Sheets

NIOBIUM CAPACITOR AND METHOD FOR MANUFACTURING SAME

TECHNICAL FIELD

The present invention relates to a niobium capacitor and a method for manufacturing same.

BACKGROUND ART

Tantalum capacitors are representative electrolytic capacitors. Tantalum capacitors are manufactured using for instance the following method. First, a sintered body is formed out of tantalum powder, next, a dielectric layer consisting of $Ta_2O_5$ is formed by anodic oxidation upon this sintered body. An electrolyte layer and an electrode (cathode) are further formed on this dielectric layer.

Tantalum possesses excellent capacitor properties. However, its mineral ore deposits are relatively scarce, which makes tantalum expensive and subject to considerable price fluctuations. For these reasons, there are ongoing studies concerning the use of niobium (Nb), which is more abundant and therefore less expensive, as a constituent material in capacitor anodes.

Anodic oxidation is used for forming dielectric layers ($Nb_2O_5$) in the manufacture of niobium capacitors. However, $Nb_2O_5$ is less stable than $Ta_2O_5$ and is relatively more prone to releasing oxygen ($O^{2-}$), whereby $Nb_2O_5$ is converted into NbO and/or $NbO_2$. Also, the closer to the niobium sintered body, the stronger the tendency of released oxygen to migrate towards the niobium sintered body. Thus, dielectric layers of tantalum oxide and niobium oxide exhibit the differences illustrated in FIGS. 8A and 8B.

As shown in FIG. 8A, a dielectric layer DL of $Ta_2O_5$ formed on a tantalum sintered body has a substantially uniform oxygen concentration across the whole layer. On the other hand, as shown in FIG. 8B, the composition of a dielectric layer DL of $Nb_2O_5$ changes first to $NbO_2$ and then to NbO in the direction towards the interface BS. In other words, the closer to the interface BS, the more the oxygen concentration drops.

In general, niobium oxide is an insulator (dielectric) when the number of oxygen atoms bonded to one niobium atom is large, and a conductor when that number is small. In the case of FIG. 8B, $Nb_2O_5$ is an insulator whereas NbO is a conductor (in a strict sense, therefore, the layer DL in the figure cannot entirely function as a dielectric layer).

Conventional niobium electrolyte capacitors have the following drawbacks. As mentioned above, niobium oxide is less stable than tantalum oxide. In conventional niobium electrolyte capacitors, therefore, heat during soldering and the influence of voltage applied during use result in a tendency toward oxygen concentration changes in the vicinity of the interface. As a result, the thickness of the conductive layer (NbO) varies, which entails that the thickness of the portion acting as a dielectric in the layer DL also changes. Specifically, conventional niobium electrolyte capacitors have a drawback in that thermal or electric influences cause a deviation from the default permittivity value, which precludes obtaining the desired capacitor characteristics (capacitance, leakage currents, etc.).

DISCLOSURE OF THE INVENTION

In light of the above considerations, an object of the present invention is to provide a niobium electrolyte capacitor that eliminates or reduces dielectric layer instability found in conventional art.

In a first aspect of the present invention, a niobium capacitor comprises an anode with niobium as its main component, and a dielectric layer formed on this anode. The junction region between the anode and the dielectric layer contains manganese.

The dielectric layer contains preferably $Nb_2O_5$.

The anode has preferably a surface layer with interstitial niobium oxide or interstitial niobium nitride as its main component.

The anode is preferably a porous sintered body of a compressed niobium-containing powder.

The niobium-containing powder has preferably a surface layer containing manganese.

The junction region contains preferably NbO and Mn.

The junction region contains preferably $MnO_2$.

The junction region contains preferably 0.1 to 10 wt % of manganese.

The dielectric layer is preferably formed by anodic oxidation on the anode, and the junction region contains preferably 0.1 to 3 wt % of manganese.

In the constitution of the niobium capacitor according to the present invention there is further provided a solid electrolyte layer formed on the dielectric layer. This solid electrolyte layer consists of $MnO_2$.

In a second aspect of the present invention is provided a method for manufacturing a niobium capacitor. This method comprises the steps of forming an anode containing niobium and manganese, and of forming a dielectric layer on the anode.

The step of forming the anode involves preferably forming a compressed molded product made of a niobium-containing powder containing in the surface layer thereof 0.1 to 10 wt % of manganese. The compressed molded product is then subsequently sintered.

The step of forming the anode involves preferably forming a sintered body made of niobium-containing powder, and then doping the sintered body with manganese.

In a third aspect of the present invention is provided another method for manufacturing a niobium capacitor. This method comprises the steps of forming an anode containing niobium, and of forming a dielectric layer containing niobium oxide as its main component and 0.1 to 10 wt % of manganese.

In the step of forming a dielectric layer, the anode undergoes anodic oxidation using preferably a chemical conversion solution containing manganese ions. Alternatively, in the step of forming a dielectric layer, the anode is oxidized in a vapor-phase atmosphere containing manganese.

The anode preferably contains any one of niobium, niobium oxide and niobium nitride, as its main component.

BEST MODE FOR CARRYING OUT THE INVENTION

Embodiments of the present invention are described in detail below, with reference made to relevant accompanying drawings.

Figure 1:
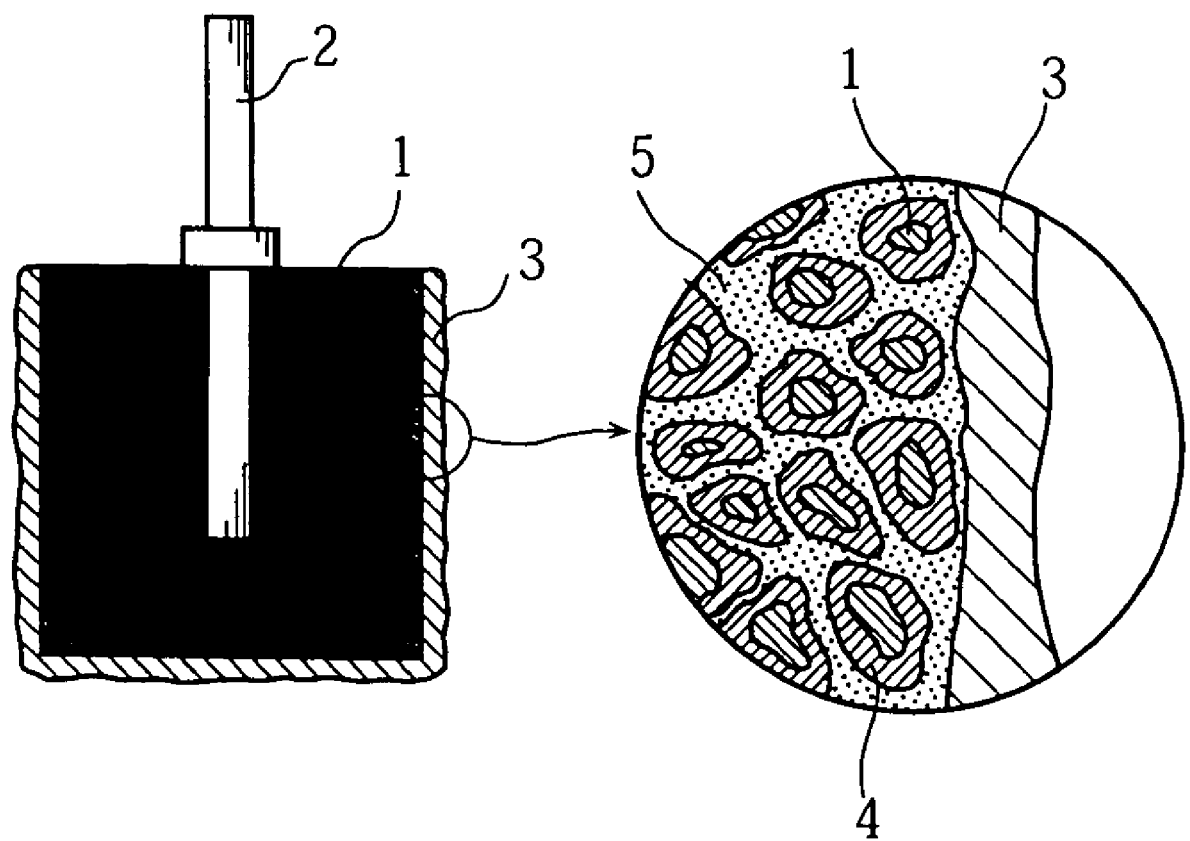
FIG. 1 is a schematic diagram showing the structure of a niobium electrolyte capacitor according to the present invention.

As shown in FIG. 1, the niobium electrolytic capacitor according to the present invention comprises a porous anode 1 consisting essentially of sintered niobium powder, an anode rod 2 partly buried in the anode 1, and a cathode layer 3. Specifically, there are formed a dielectric layer 4 and a solid electrolyte layer 5 between the anode 1 and the cathode layer 3. The dielectric layer 4 is in close contact with the anode 1, in such a way so as to prevent an electric connection between the anode 1 and the solid electrolyte layer 5.

The anode 1 can be formed by sintering a compression-molded niobium-containing powder. Niobium powders that may be used have a specific surface area (weight ratio capacitance) of 2000 CV/g or more (preferably 2000 to 500000 CV/g or more). The sintering temperature is set, for instance, from 1000 to 1500° C.

Figure 8B:
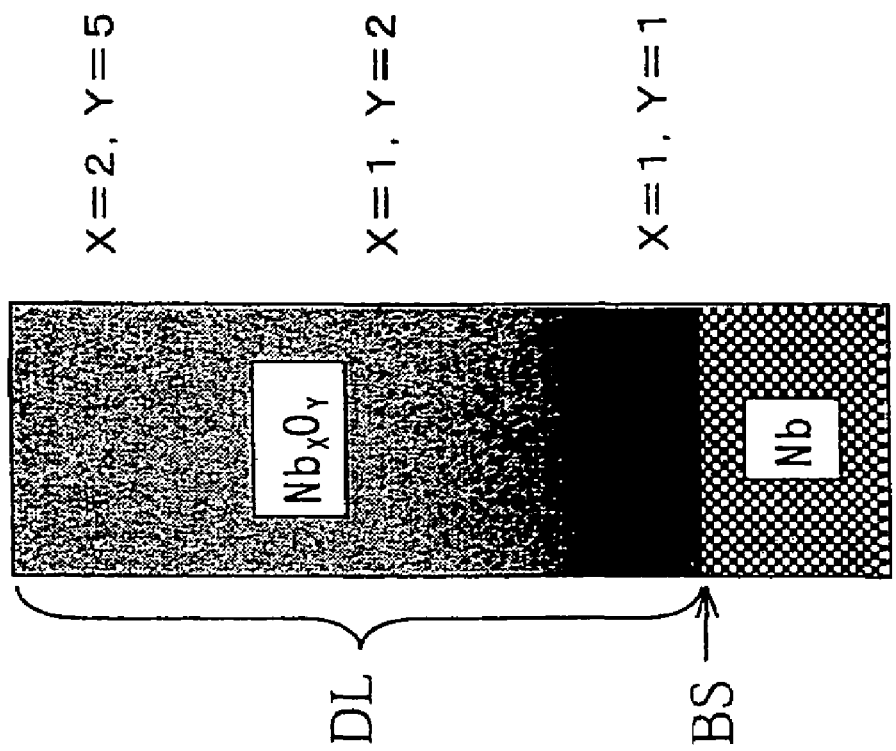
FIG. 8B is a schematic diagram showing the constitution of a dielectric layer in a niobium capacitor.
Figure 8A:
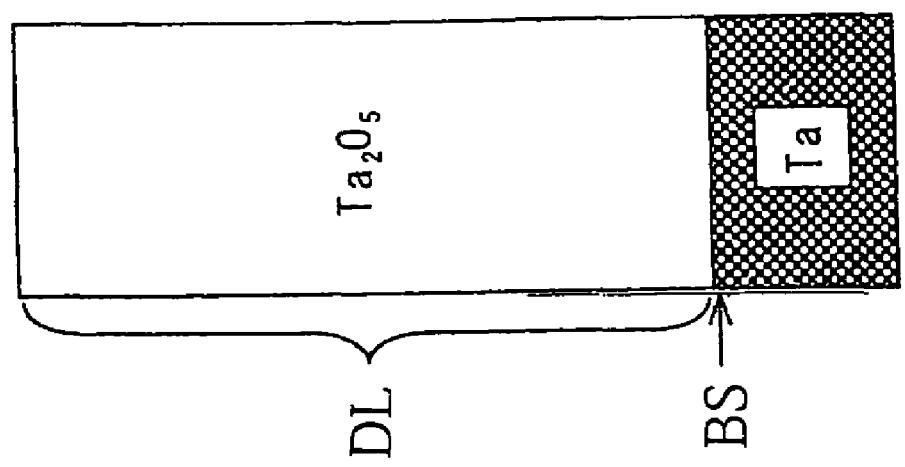
FIG. 8A is a schematic diagram showing the constitution of a dielectric layer in a tantalum capacitor.

In the embodiment shown in the figure, niobium is the main component of the anode 1, but the present invention is not limited thereto. The main component may also be, besides niobium, a niobium oxide or a niobium nitride. Niobium oxide and niobium nitride need not be homogeneously distributed throughout the sintered body and may be present only at the surface. A typical niobium oxide is NbO, while a typical niobium nitride is NbN. The niobium oxide or niobium nitride is preferably interstitial. The dielectric layer 4, as shown in FIG. 8B, contains a niobium oxide such as $Nb_2O_5$, etc. The solid electrolyte layer 5 consists, for instance, of $MnO_2$. Alternatively, the solid electrolyte layer 5 may consist of a conductive polymer. Conductive polymers include for instance polythiophenes or polypyrroles.

In the present invention, the "junction region" between the anode 1 and the dielectric layer 4 contains manganese (Mn). The "junction region" refers herein to a region encompassing the boundary between the anode 1 and the dielectric layer 4, and adjacent areas to this boundary. The junction region contains manganese preferably in the form of manganese dioxide $MnO_2$. As a boundary, the junction region may be considered to be divided into a sintered body portion and a dielectric layer portion. There are three ways in which manganese may be contained in the "junction region", as follows. (1) Manganese is contained only in the sintered body portion. (2) Manganese is contained only in the dielectric layer portion. (3) Manganese is contained both in the sintered body portion and in the dielectric layer portion.

The amount of manganese in the aforementioned junction region is for instance 0.1 wt % or more. With an amount of manganese below 0.1 wt %, niobium oxide tend to become unstable, as in conventional cases. The upper limit of manganese content depends on the way the dielectric layer 4 is formed, of which two concrete examples are described next. In the first example, the dielectric layer 4 is formed by anodic oxidation using a chemical conversion solution containing manganese ions. In this case, the manganese content in the dielectric layer is preferably 3 wt % or less. The reason for this is that an amount of manganese above 3 wt % results in manganese salts leaching towards the surface of the dielectric layer 4, which prevents the formation of a dielectric layer 4 having a suitable, intimate adhesion to the anode 1. The second example involves the formation of the dielectric layer 4 by vapor-phase oxidation in an atmosphere containing manganese. In this case, the amount of manganese is 10 wt % or less. This limiting figure derives from the fact that the upper limit of manganese content in vapor-phase oxidation stands ordinarily at about 10 wt %. If feasible, therefore, the manganese content may be greater than 10 wt %.

Two techniques may be devised for incorporating Mn into the anode 1. In a first technique, the anode 1 is formed using a niobium powder containing Mn in its surface. In a second technique, a niobium powder not containing Mn is compression-molded and then sintered. The molded product is subsequently doped with Mn. The amount of Mn in the sintered body (value before formation of the dielectric layer 4) is set in accordance with the Mn content that will be required at the junction region, and is for instance 0.1 to 10 wt %.

In the formation of the dielectric layer 4 by anodic oxidation, a 0.1 wt % aqueous solution of phosphoric acid is used for instance as the chemical conversion solution. If Mn ions are present in the chemical conversion solution, the dielectric layer will contain Mn when formed. Anodic oxidation is carried out by applying a predetermined voltage between the sintered body, dipped in the chemical conversion solution, and the cathode that will be paired with this sintered body. The temperature of the chemical conversion solution, ranges from room temperature to 100° C. The applied voltage (target voltage) ranges from 5 to 120 V, and the current density ranges from 10 to 100 $\mu A/cm^2$. The current-application time ranges from 0.1 to 30 hours. Current is preferably applied under small current values in order to keep leakage currents low.

Vapor-phase oxidation may be carried out by heating the anode 1 in a normal air atmosphere. The heating of the anode 1 may alternatively take place at reduced pressure or in an atmosphere of oxygen diluted in argon, etc. The heating temperature ranges for instance from 200 to 400° C. The atmosphere may contain Mn during vapor-phase oxidation. That way, the formed dielectric layer ends up containing Mn.

Niobium oxides are unstable in conventional niobium capacitors, so the characteristics of the capacitor vary in accordance with the influence of heat or applied voltages. This problem can be effectively suppressed or reduced through a "junction region" containing manganese. The presence of manganese keeps constant the number of oxygen atoms bonded to niobium in the dielectric layer 4, thereby stabilizing niobium oxide. For instance, oxygen from $MnO_2$ replenishes oxygen released by niobium oxide, wherein the amount of oxygen supplied depends on the amount released. As a result, the number of oxygen atoms bonded to niobium is kept constant. The presence of Mn in the vicinity ("junction region") of the interface where a niobium valence change is likely to occur results as well in niobium oxide becoming more stable than in conventional cases.

Figure 2:
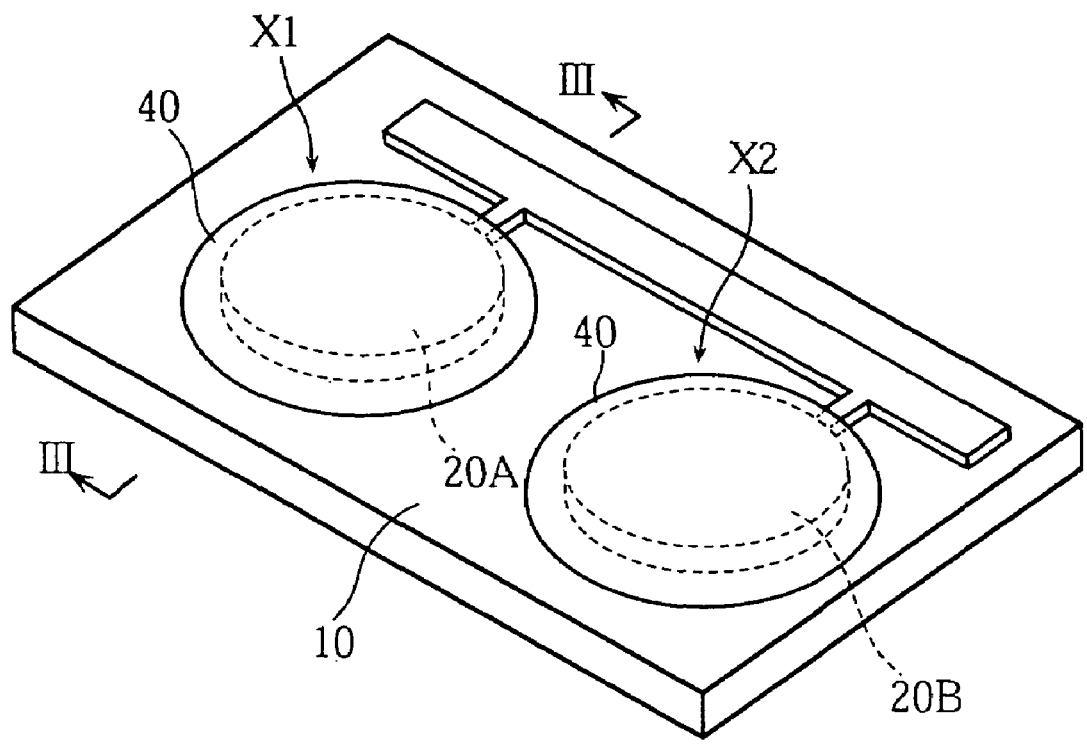
FIG. 2 is a perspective view of thin-layer capacitors used to verify the effect of the present invention.
Figure 3:
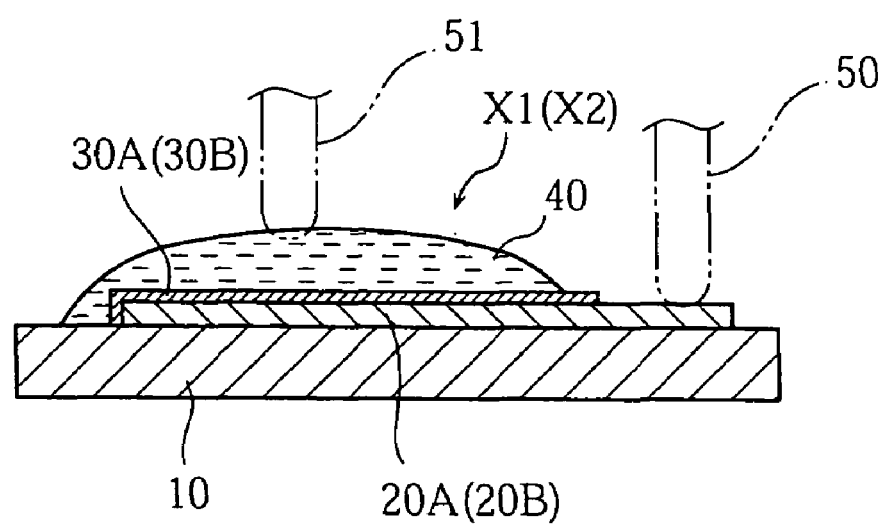
FIG. 3 is a cross-section of FIG. 2 along the line III—III.

In order to verify the effect of the present invention, experiments were carried out using the thin-layer capacitors X1 and X2 shown in FIGS. 2 and 3.

The capacitors X1 and X2 are formed on an ordinary glass substrate 10. As can be seen in FIG. 2, the glass substrate 10 supports conductors 20A, 20B having an identical shape. The conductors 20A, 20B were formed by DC sputtering (the thickness of the conductors was about 300 nm, and their projected areas were 1 cm². Pure niobium and manganese were mixed in vapor phase for forming the conductor 20A by sputtering. The obtained conductor 20A contained 6 wt % of manganese and 94 wt % of niobium. The conductor 20B was formed with niobium alone.

Dielectric layers 30A and 30B were formed respectively over the conductors 20A and 20B (FIG. 2). The dielectric layers 30A and 30B were formed by anodic oxidation using a 0.1 wt % solution of phosphoric acid. The final voltage FV herein was 25.5V and the treatment lasted 2 hours.

The dielectric layers 30A and 30B were covered by an electrolyte 40. The electrolyte used was a 0.1 wt % solution of phosphoric acid.

Figure 4:
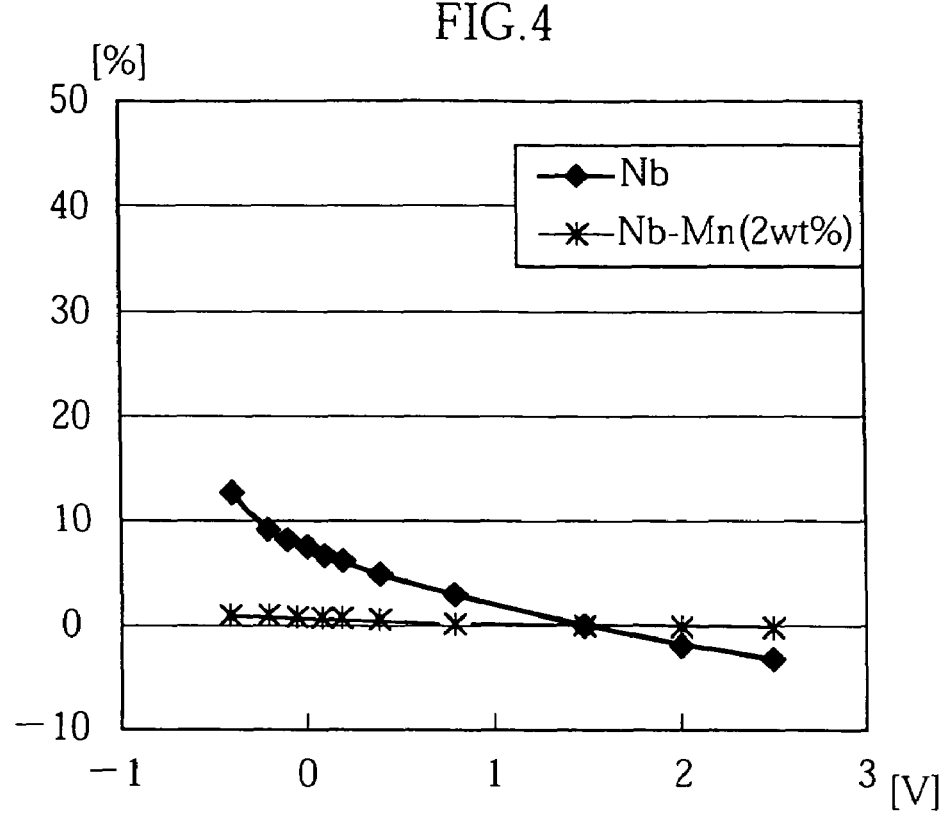
FIG. 4 is a graph showing the "DC bias voltage (V)—capacitance change rate (%)" relationship for the capacitors of FIG. 2.

FIG. 4 is a graph showing the "DC bias voltage (V)—capacitance change rate (%)" relationship for capacitors X1 and X2. The measurements were carried out by contacting an electrode rod 50 with the conductor 20A (20B), and an electrode rod 51 with the electrolyte 40, as shown in FIG. 3. In this state, a predetermined voltage was applied to capacitors X1 and X2 in order to measure their capacitances. The graph in FIG. 4 shows the capacitance changes for each of the applied voltages relative to a baseline capacitance corresponding to an applied voltage of 1.5V.

As the graph in FIG. 4 shows, the capacitor X2 (where pure niobium was used as the conductor 20B) displays a highly voltage-dependent capacitance, i.e. large capacitance changes in response to voltage changes. By contrast, hardly any capacity changes were observed for the capacitor X1 (where the conductor 20A contained Mn). That is, voltage dependency was lower.

Figure 5:
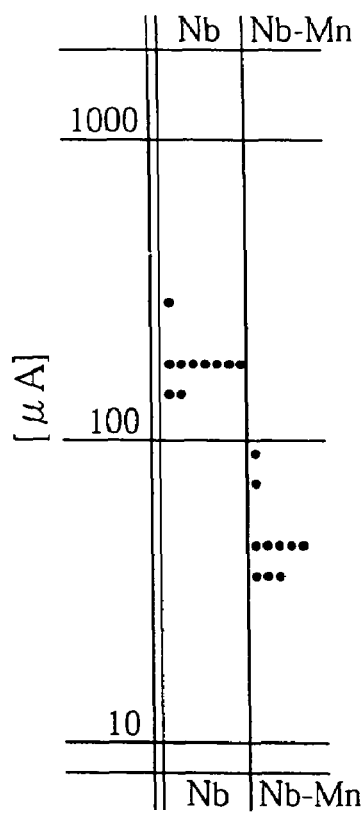
FIG. 5 shows the measurement results for leakage currents in the capacitors of FIG. 2.

FIG. 5 shows the measurement results for leakage currents in the capacitors X1 and X2. These leakage currents are values measured after 1 minute of applying a voltage equivalent to 65% of the aforementioned FV voltage (25.5V) (the measurements were performed for 10 samples each of the capacitors X1 and X2). As can be seen in FIG. 5, leakage currents were markedly lower for capacitor X1, as compared with capacitor X2.

The relationship between manganese concentration in the dielectric layer of the niobium capacitor and the characteristics of the capacitor is explained next, with reference made to FIGS. 6 and 7. Capacitors with a constitution identical to that of capacitors of FIGS. 2 and 3 were used for studying this relationship. The conductive layer formed by pure niobium had a diameter of 1 cm. Four types of conductive layer with differing manganese concentrations were prepared (0 wt %, 0.1 wt %, 0.2 wt %, 2.0 wt %). A 0.1 wt % phosphoric acid solution containing the target amount of Mn ions was used as the chemical conversion solution. The final voltage FV herein was 20V and voltage was applied for 2 hours.

Figure 6:
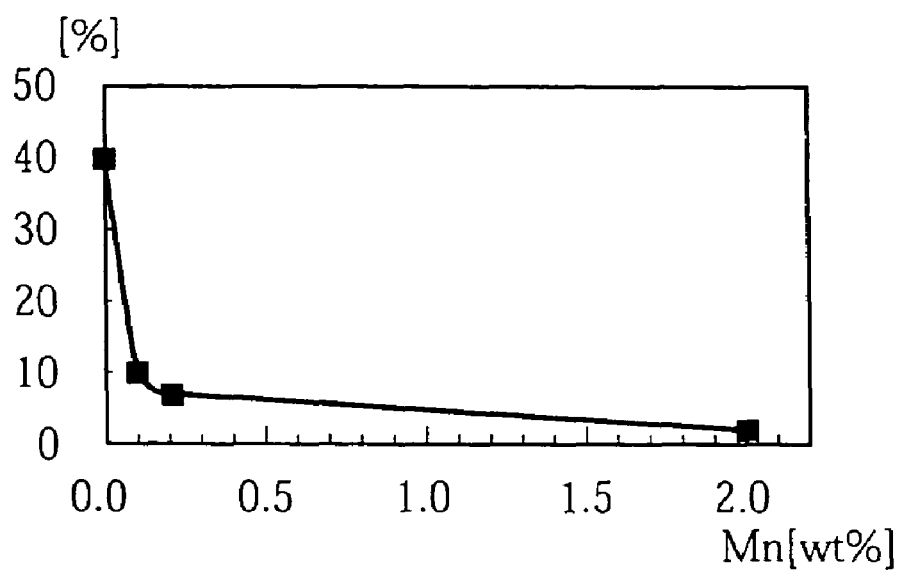
FIG. 6 is a graph showing the relationship between manganese concentration and capacitance change rate.
Figure 7:
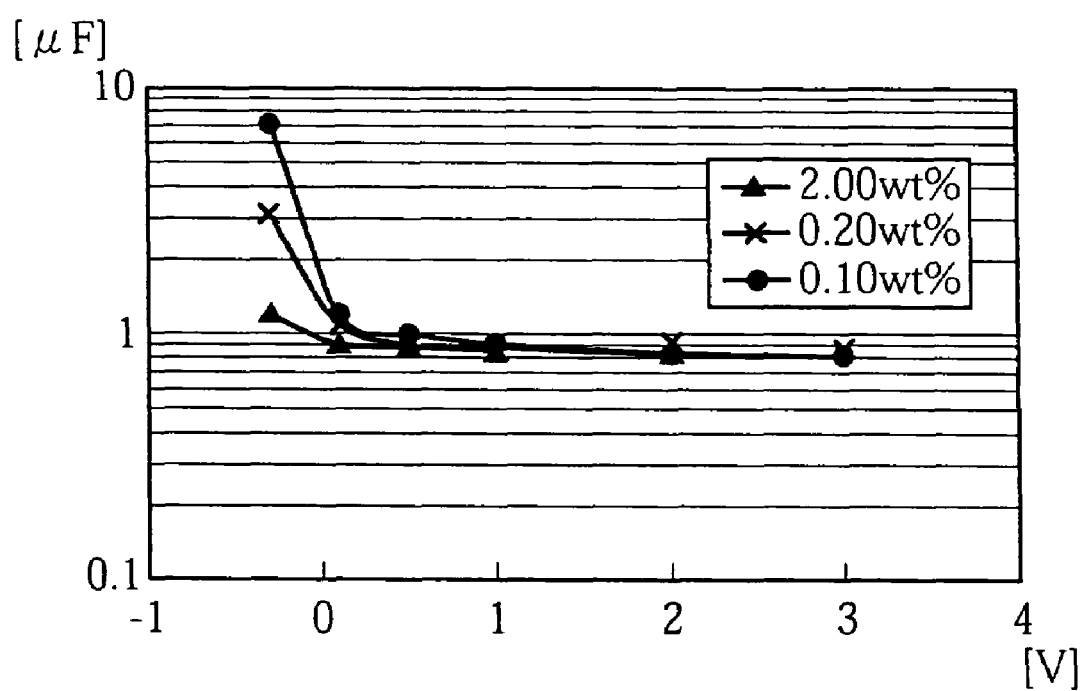
FIG. 7 is a graph showing the relationship between applied voltage and capacitor capacitance.

The graph in FIG. 6 shows the capacitance change rate when the voltage applied to the capacitors changed from 0V to 3V. The graph in FIG. 7 illustrates the relationship between applied voltage and capacitance for the different manganese concentrations (0.1 wt %, 0.2 wt %, 2.0 wt %). As these graphs show, the rate of capacitance change becomes smaller (capacitance stabilization) as the manganese concentration increases. This effect can be satisfactorily achieved even for concentrations of manganese of 0.1 wt %.

As will be apparent to those skilled in the art, the embodiments of the present invention described above can be subject to all manner of modifications. It is therefore to be understood that such modifications may be made and other arrangements may be devised by those skilled in the art without departing from the spirit and the scope of the present invention as defined by the appended claims.

The invention claimed is:

1. A niobium capacitor comprising:
   an anode with niobium as its main component, and
   a dielectric layer formed on said anode,
   wherein said anode contains manganese in an amount sufficient for stabilizing the dielectric layer, and
   wherein said anode has a surface layer with niobium oxide as its main component.

2. A niobium capacitor according to claim 1, wherein said dielectric layer contains $Nb_2O^5$.

3. A niobium capacitor according to claim 1, wherein said niobium oxide is an interstitial compound.

4. A niobium capacitor according to claim 1, further comprising a solid electrolyte layer formed on said dielectric layer, said solid electrolyte layer consisting of $MnO_2$.

5. A niobium capacitor comprising:
   an anode with niobium as its main component, and
   a dielectric layer formed on said anode,
   wherein said anode contains manganese in an amount sufficient for stabilizing the dielectric layer, and
   wherein said anode has a surface layer with niobium nitride as its main component.

6. A niobium capacitor according to claim 5, wherein said niobium nitride is an interstitial compound.

7. A niobium capacitor comprising:
   an anode with niobium as its main component, and
   a dielectric layer formed said anodes,
   wherein said anode contains manganese in an amount sufficient for stabilizing the dielectric layer,
   wherein said anode is a porous sintered body of a compressed niobium-containing powder, and
   wherein said niobium-containing powder has a surface layer containing manganese.

8. A niobium capacitor comprising:
   an anode with niobium as its main component, and
   a dielectric layer formed on said anode,
   wherein said anode contains manganese in an amount sufficient for stabilizing the dielectric layer, and
   wherein a junction region between said anode and said dielectric layer contains NbO and Mn.

9. A niobium capacitor according to claim 8, wherein said junction region contains $MnO_2$.

10. A niobium capacitor according to claim 8, wherein said junction region contains 0.1 to 10 wt % of manganese.

11. A niobium capacitor according to claim 8, wherein said dielectric layer is formed by anodic oxidation on said anode, and said junction region contains 0.1 to 3 wt % of manganese.

12. A method for manufacturing a niobium capacitor, comprising the steps of:
   forming an anode containing niobium; and
   forming a dielectric layer on said anode;
   wherein the step of forming said anode is performed to cause said anode to additionally contain manganese in an amount sufficient for stabilizing said dielectric layers, and
   wherein the step of forming said anode involves forming a compressed molded product made of a niobium-containing powder containing in a surface layer thereof 0.1 to 10 wt % of manganese, and then sintering said compressed molded product.

13. A method for manufacturing a niobium capacitor according to claim 12, wherein the step of forming said anode involves forming a sintered body made of niobium-containing powder, and then doping said sintered body with manganese.

14. A method for manufacturing a niobium capacitor, comprising the steps of:
   forming an anode containing niobium, and
   forming a dielectric layer containing niobium oxide as its main component and 0.1 to 10 wt % of manganese;
   wherein in the step of forming said dielectric layer, said anode is oxidized in a vapor-phase atmosphere containing manganese.

15. A method for manufacturing a niobium capacitor according to claim 14, wherein said anode contains any one of a niobium, niobium oxide and niobium nitride, as its main component.

16. A niobium capacitor comprising:
   an anode with niobium as its main component; and
   a dielectric layer formed on said anode,
   wherein the junction region between said anode and said dielectric layer contains manganese;
   wherein said anode has a surface layer with niobium nitride as its main component; and
   wherein said niobium nitride is an interstitial compound.

* * * * *